Nov. 18, 1930.  S. H. EARL  1,781,721
CHUCK
Filed June 30, 1924

INVENTOR.
Schuyler H. Earl
BY
his ATTORNEY

Patented Nov. 18, 1930

1,781,721

UNITED STATES PATENT OFFICE

SCHUYLER H. EARL, OF ROCHESTER, NEW YORK, ASSIGNOR TO GLEASON WORKS, OF ROCHESTER, NEW YORK, A CORPORATION OF NEW YORK

CHUCK

Application filed June 30, 1924. Serial No. 723,287.

The subject of the present invention is an arbor or chucking device for securing work pieces in position, and the invention relates more particularly to means for securing a gear to its spindle in a machine upon which work is to be done on the gear.

One of the objects of the present invention is the provision of means which may be actuated to clamp the gear on the spindle against both axial and rotational movement.

A further object of this invention is the provision of means which may be actuated into engagement with the gear to clamp the same in position on the spindle, and which may be released from its engaging position to permit removal from or placing on the spindle of the gear without disconnection of the clamping means from the spindle.

Other objects include the provision in a chucking device, of means for quickly and securely clamping a work piece in position, which is easy and economical to construct, and which will not readily get out of order.

With the above and other objects in view, my invention resides in the novel arrangement and combination of parts and in the details of construction hereinafter described and claimed, it being specifically understood that the invention is not limited to the particular structure embodied in the accompanying drawings and described in the specification, but that the structure may be modified within the limits of the appended claims.

A practical embodiment of my invention is illustrated in the accompanying drawings, in which:—

Figure 1:
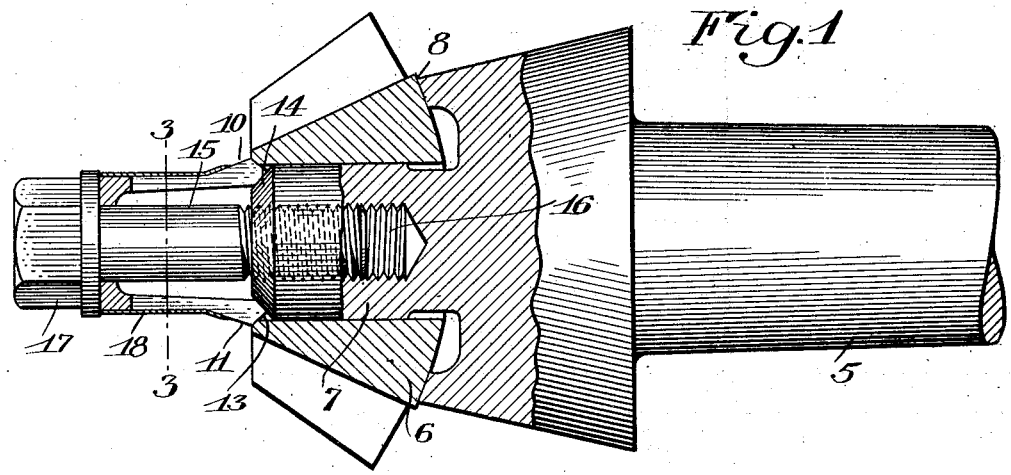
Figure 1 is a side elevation, partly in section, of the clamping member expanded upon a spindle so as to clamp a gear thereon.
Figure 2:
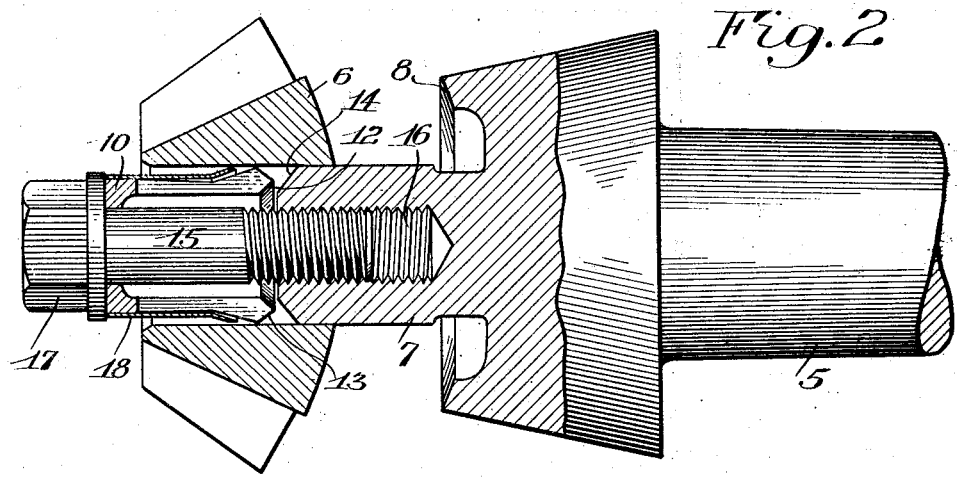
Figure 2 is a side elevation, partly in section, of the clamping member in collapsed condition with the gear partly removed from the spindle.
Figure 3:
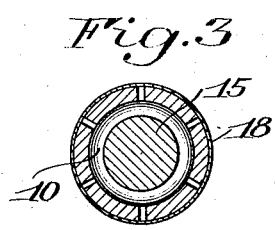
Figure 3 is a section on the line 3—3 of Figure 1.

Referring to the drawing by numerals of reference, I have shown at 5 a spindle or support of any suitable structure upon which the gear or pinion 6 is mounted. The spindle itself may be mounted upon any suitable machine and is designed to support the gear for work thereon, for testing of the same, etc. As shown, the spindle is provided with a reduced outer end 7 forming a shoulder 8. The gear or pinion is mounted upon the reduced portion of the spindle and is adapted to be moved thereon to seat one face against the shoulder 8.

To clamp the gear in position upon the spindle, I preferably employ an expanding member 10 comprising a cylindrical bushing split lengthwise for a portion of its length to form a plurality of arcuate fingers 11 provided at their outer ends with converging bearing faces 12 and 13. This bushing is adapted to be connected to the spindle and to be expanded from a collapsed position to a position of engagement with the gear to clamp the same on the spindle.

For the purpose of expanding the bushing, the bushing may be moved axially toward the gear so that the faces 12 of the fingers are brought into contact with a cooperating beveled portion 14 of the spindle and are thus forced outwardly. This outward expansion forces the bevel faces 13 of the fingers into secure engagement with a portion of the bore and the outer face of the gear and thus the gear is simultaneously locked against axial and rotational movement.

Any suitable means may be employed for supporting or connecting the bushing to the spindle. I preferably use for this purpose a bolt 15, which is threaded into a recess 16 in the outer end of the spindle. For actuating the bushing so as to move the same axially to bring the fingers into engagement with the spindle and gear any suitable means may be employed. In the embodiment of the invention illustrated the bolt 15 serves this purpose, the bolt head 17 being of sufficient diameter to force the bushing toward the gear on threading of the bolt.

For the purpose of permitting ready removal and placing of the gear on the spindle or support, I preferably construct the bushing with a maximum diameter in collapsed condition less than the minimum diameter of the bore of the gear so that the gear may be removed from or placed on the spindle without disconnection of the bushing by sliding the gear over the collapsed bushing. Where a bolt, or similar means, is employed as the actuating member I preferably construct the head of the same, also, of less diameter than the minimum diameter of the bore of the gear so that partial unthreading of the bolt and collapsing of the bushing will permit ready removal from and replacement of the gear on the spindle. This structure speeds up work considerably as it is not necessary to remove and replace the clamping member each time a new gear is to be positioned or to be removed.

Figure 5:
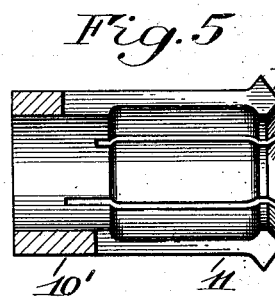
Figure 5 is a sectional view of a modified form of bushing.
Figure 4:
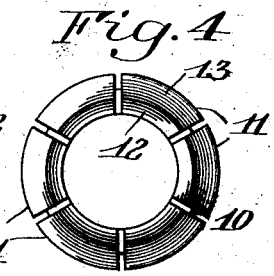
Figure 4 is an end elevation of the expanding bushing.

In the modification shown in Fig. 5, the lengthwise cuts in the bushing $10^1$ are made of different depths. It has been found that for certain purposes this construction provides a bushing of greater strength.

To prevent chips or particles from entering between the fingers of the bushing when expanded, I may employ a sleeve 18 of the general type shown which is formed with an outwardly tapered portion at one end, and which is adapted to be fitted over the bushing and to be moved axially thereon by the bolt as the bushing is moved into clamping position. The use of this sleeve, however, is not essential.

While I have used the term "gear" to describe the member which is to be clamped in place, it is to be understood throughout the specification and claims that the term "gear" is employed to designate a gear or pinion, or in fact any member formed with a bore which it is desired to clamp upon a support which is adapted to enter the bore.

While I have described a particular structure, it is to be understood that my invention is not limited to the precise embodiment described but may be modified within the limits of the appended claims.

Having thus described my invention, what I claim is:—

1. A chuck for gears comprising a spindle having a shoulder against which the inner end of a gear is adapted to seat and a cylindrical bearing portion which is of a diameter corresponding to the diameter of the bore of the gear, said bearing portion being adapted to enter the bore of the gear and extend to a point adjacent the outer end face of the gear to form the sole support for said gear, said bearing portion being tapered at its outer end to form a conical nose, and a split collet having fingers tapered at their inner ends to engage the nose of the spindle to expand the collet on axial movement of the same in one direction, and means adapted to be connected to said spindle for moving the collet axially, said collet when collapsed having a maximum diameter less than the minimum diameter of the bore of the gear whereby the gear may be removed from the spindle without removing the collet therefrom.

2. In a chuck, the combination with a gear, a spindle having a tapered nose, a shoulder against which the back of the gear is adapted to seat and a portion adapted to enter the bore of the gear to support the same, the last named portion being cylindrical and of a diameter corresponding to the diameter of the bore of the gear whereby the gear is centered on the spindle wholly by said cylindrical portion, of a collapsible bushing having tapered surfaces adapted to engage the nose of the spindle to expand the bushing to clamp the gear on the spindle and a cover surrounding said bushing adapted to protect said bushing against entrance of foreign matter between the parts of said bushing, said bushing when collapsed and said cover having maximum diameters less than the minimum diameter of the bore of the gear to permit removal of the gear from the spindle without disconnecting the bushing or cover therefrom.

3. A chuck for gears comprising a spindle constructed to enter the bore of a gear to support the same and having means thereon against which the inner end of the gear seats, a collapsible bushing, said bushing and spindle having co-operating parts adapted to expand the bushing on axial movement thereof in one direction to clamp a gear on the spindle, and means for moving the bushing axially of the spindle, the maximum diameter of the means for moving the bushing and of the bushing, when collapsed, being less than the minimum diameter of the bore of the gear whereby the gear may be removed from said spindle without removal of the bushing or the means for moving the same.

4. A chuck for gears comprising a supporting member having a shoulder against which the rear end of a gear is adapted to seat and a bearing portion adapted to enter the bore of a gear to support the same, said bearing portion having a tapered nose, a split collet having fingers tapered at their inner ends to engage the nose of the bearing portion so that when the collet is moved inwardly it is expanded, and a member having threaded engagement with said supporting member and adapted to engage said collet to move the same axially, said collet when collapsed and said last named member being of a smaller diameter than the minimum diameter of the bore of the gear whereby the gear may be removed without removing the collet and last named member.

5. In a chuck, the combination with a gear and a spindle adapted to enter the bore of the gear to support the same, the portion of said spindle extending within the bore of said gear being cylindrical and of a diameter corresponding to the diameter of the bore of the gear for a part of its length and said spindle being provided with an outer beveled end, of an expansible bushing provided at its inner end with V-shaped faces adapted on axial movement of the bushing in one direction to contact with the beveled end of the spindle and the adjacent portion of the gear respectively to expand the bushing and to clamp the gear against axial and rotation movement on the spindle and means connected to the spindle and adapted to be moved in one direction to bring the bushing and spindle into engagement and to be moved in the opposite direction to permit collapse of said bushing, the maximum diameter of said means and of said bushing when collapsed being less than the minimum diameter of the bore of the gear whereby to permit removal of the gear from the spindle by drawing it over said means and bushing.

In witness, whereof, I have hereunto set my signature.

SCHUYLER H. EARL.